(12) United States Patent
Cheng et al.

(10) Patent No.: US 7,304,424 B2
(45) Date of Patent: Dec. 4, 2007

(54) ANODE PLATE FOR A FIELD EMISSION DISPLAY DEVICE

(75) Inventors: Ying-Hsien Cheng, Kaohsiung (TW); Cheng-Chung Lee, Taitung (TW); Wen-Kuei Huang, Chiayi (TW); Wei-Yi Lin, Yunlin Hsien (TW); Jia-Chong Ho, Taipei Hsien (TW); Yu-Yang Chang, Tainan (TW); Ming-Chun Hsiao, Hsinchu Hsien (TW); Yun-Chiao Hsiao, Hsinchu Hsien (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 287 days.

(21) Appl. No.: 10/760,384

(22) Filed: Jan. 21, 2004

(65) Prior Publication Data

US 2005/0046335 A1    Mar. 3, 2005

(30) Foreign Application Priority Data

Sep. 2, 2003    (TW) .............................. 92124180 A

(51) Int. Cl.
*H01J 29/90*    (2006.01)
(52) U.S. Cl. ............. 313/495; 174/17.08; 313/477 HC
(58) Field of Classification Search ........ 313/494–497, 313/498, 477 HC, 583; 174/17.08, 50.52, 174/50.6
See application file for complete search history.

(56) References Cited

U.S. PATENT DOCUMENTS

| | | | | |
|---|---|---|---|---|
| 3,995,943 A | * | 12/1976 | Jasinski | 359/269 |
| 4,386,293 A | * | 5/1983 | Waldron | 313/583 |
| 4,626,741 A | * | 12/1986 | Morimoto et al. | 313/497 |
| 5,107,176 A | * | 4/1992 | Endo et al. | 313/583 |
| 5,424,605 A | * | 6/1995 | Lovoi | 313/422 |
| 5,565,742 A | * | 10/1996 | Shichao et al. | 315/366 |
| 6,476,547 B1 | * | 11/2002 | Kawase | 313/495 |

* cited by examiner

*Primary Examiner*—Nimeshkumar D. Patel
*Assistant Examiner*—Christopher M. Raabe
(74) *Attorney, Agent, or Firm*—Bacon & Thomas, PLLC

(57) ABSTRACT

An anode plate for a field emission display device (FED) is disclosed, which has a substrate; an anode conductive layer formed on the substrate; at least one interspacing conductive band having a plurality of internal gaps for connecting the anode conductive layer and external cable lines, wherein the interspacing conductive band covers a part of the anode conductive layer; and a fluorescent layer located on the anode conductive layer, to serve as a source of luminescence for a field emission display device. The field emission display device includes the anode plate aforesaid as is also disclosed.

13 Claims, 4 Drawing Sheets

ANODE PLATE FOR A FIELD EMISSION DISPLAY DEVICE

BACKGROUND OF THE INVENTION

1. Field of the Invention

The present invention relates to an anode plate for a field emission display device and, more particularly, to an anode plate for a carbon nanotube field emission display device with triode structure.

2. Description of Related Art

The field emission display devices (FEDs) may eventually replace the conventional cathode ray tube (CRT) displays and will be widely applied to related electronic products in the coming future owing to the FED's advantages of large active area, short response time, and wide viewing angle. The luminescence principle of conventional FEDs with carbon nanotubes can be described as follows. The electrons are drawn from the tips of carbon nanotubes under the effect of an electrical field in a high vacuum circumstance around $10^{-6}$ torr and, subsequently, accelerated by the positive voltage of the anode plate to hit the fluorescent powders dispersed on the anode plate. Consequently, the luminescence phenomenon occurs. With reference to FIG. 1, there is shown the triode structure of a conventional field emission display device. Conventionally, the cathode plate 110 composed of thin film field emission array (FEA) and the anode plate 120 having a fluorescent powder layer formed by thick film screen printing are packaged through vacuum sealing in a high vacuum circumstance of $10^{-6} \sim 10^{-7}$ torr. Currently, vacuum sealing uses the frits having an approximately similar coefficient of expansion to the glass substrate of the anode plate 120 to form the adhesive layer, which is then melted in a high temperature process and sintered to achieve the complete sealing between the anode plate and the cathode plate. However, part of the anode conducting band, e.g. the ITO layer, needs to be exposed outside the active area for connecting, so it might contact the frits and therefore be damaged during the high temperature sealing process. As a result, the operation of circuits in the display is hindered. So, a metal layer 140 that is easily oxidized is deposited on part of the transparent conducting band 130 that overlaps the frits for protecting the transparent conducting band 130. Nevertheless, the conducting band 130 with a lump pattern frequently cracks because of the thermal stress caused by the difference in coefficients of expansion between the conducting band 130 and the frits during cooling. This crack will further obstruct the construction of vacuum space between the anode and cathode plates and lead to production of defective display panels.

Therefore, it is desirable to provide an anode plate for a field emission display device to mitigate and/or obviate the aforementioned problems. In the prior arts, research had been done on the analyses of the chemical and physical qualities of the adhesive materials dissolved in various kinds of solvents, dispersants, plasticizers, or binders for improving the degree of vacuum in the field emission display device, but there were no studies in the pattern of the anode conducting band.

SUMMARY OF THE INVENTION

The object of the present invention is to provide an anode plate for a field emission display device so that any crack occurring during the high temperature sealing process of the cathode plate and the anode plate is reduced in size, the functions and the flexibility in use of the electrically conductive layer are maintained, and the sealing strength between the plates is enhanced.

Another object of the present invention is to provide a field emission display device, of which the transparent conductive materials are not easily damaged, the high vacuum between the anode and cathode plates is built, and the operations of circuits are not hindered.

To achieve the object, the anode plate for a field emission display device of the present invention includes a substrate; an anode conductive layer formed on the substrate; at least one interspacing conductive band having a plurality of internal gaps for connecting the anode conductive layer and external cable lines, wherein the interspacing conductive band covers a part of the anode conductive layer; and a fluorescent layer located on the anode conductive layer, to serve as a source of luminescence for a field emission display device.

To achieve the object, the field emission display device of the present invention includes a cathode plate having a plurality of carbon nanotubes formed thereon for generating electrons; an anode plate having a electrically conductive layer and a fluorescent layer formed thereon, wherein the electrically conductive layer is composed of an anode conductive layer and at least one interspacing conductive band, the anode conductive layer is sandwiched between the anode plate and the fluorescent layer for exerting positive voltage on the anode plate, which accelerates the electrons generated from the carbon nanotubes to hit the fluorescent layer and induces the luminescence phenomenon, and the interspacing conductive band serves to connect the anode conductive layer with the external cable lines; a side frame mounted on the joints where the cathode plate and the anode plate are bonded together, to form a fixed space between the cathode plate and the anode plate, wherein the fluorescent layer is located at the inner side of the side frame, and the interspacing conductive band is sandwiched between the anode plate and the side frame; and an adhesive layer disposed between the anode plate and the side frame and between the cathode plate and the side frame, to fix the side frame on the anode plate as well as the cathode plate.

In the manufacturing of field emission display devices, it is critical to build the high vacuum space therein, so the present invention is mainly aimed on resolving the problem of any crack occurring at the conducting band and the adhesive layer during the high temperature sealing process. Because the crack is caused by the thermal stress that is induced by the difference of coefficients of expansion between the conducting band and the adhesive layer, the pattern of the conducting band is changed from lump to porous by the present invention. Therefore, a plurality of gaps formed in the conducting band provides the flexible spaces for thermal expansion. The shape and distribution of the gaps in the conducting band are designed selectively to fulfill all kinds of requirements. For example, the gap may be a slit or a hole. The size of the slits or the holes or the distance therebetween may be equal or unequal. Owing to the reduction of thermal stress by the present invention, a satisfactory vacuum space between the plates is consequently obtained, and a field emission display device is therefore produced successfully.

The anode conductive layer of the electrically conductive layer of the present invention is generally made of transparent conductive glass, such as indium tin oxide (ITO), and the interspacing conductive band is generally composed of strips of ITO glass covered by a metal layer, a metal oxide layer, or the combinations thereof. The metal layer or metal oxide layer serves to cover and protect the transparent ITO glass thereunder, to extend the lifetime of the conducting band, and to improve the characteristics of the conducting band. The material of the metal layer is not restricted, and preferably is chromium (Cr), aluminum (Al), or zinc (Zn). Similarly, the material of the metal oxide layer is not restricted, and preferably is chromium oxide, aluminum oxide, or zinc oxide. The method for forming the electrically conductive layer, the metal layer, or the metal oxide layer can be any conventional deposition and patterning method. Preferably, they are formed through thin film deposition followed by a photolithography process, or through screen-printing. More preferably, the processing steps of the metal layer and the metal oxide layer are integrated with the existing processing steps of the field emission display devices for simplicity.

The structure of the field emission display device of the present invention can be any conventional structure. Basically, the structure includes a cathode plate, an anode plate, a side frame, a fluorescent layer, an adhesive layer, and a plurality of carbon nanotubes. Preferably, a plurality of transistors is included to control the switches of a pixel. The adhesive layer is preferably made of the frits, which has an approximately similar coefficient of expansion to the glass substrate of the anode plate, so that the crack caused by the difference in coefficient of expansion between the adhesive layer and the anode plate is substantially avoided.

If the interspacing conductive band has a pattern of stripes, the stripes may be straight or bent. The ratio of the width of the stripes to the width of the internal gaps is not particularly restricted, and mainly depends on the materials of the adhesive layer and the spreading area thereof. Preferably, the width of the stripes equals that of the internal gaps as the internal gaps of the interspacing conductive band form a pattern of straight stripes or bent stripes. If the internal gaps of the interspacing conductive band form a pattern of porous style, the ratio of the square measure of the interspacing conductive band and the square measure of the internal gaps (or goles) is not particularly restricted, either. It mainly depends on the materials of the adhesive layer and the spreading area thereof, too. Preferably, the square measure of the interspacing conductive band equals that of the internal gaps. Moreover, the length of the interspacing conductive band is preferably longer than the width of the spreading area of the adhesive layer, so the interspacing conductive band is prevented from contacting with the adhesive layer.

Other objects, advantages, and novel features of the invention will become more apparent from the following detailed description when taken in conjunction with the accompanying drawings.

DETAILED DESCRIPTION OF THE PREFERRED EMBODIMENT

Embodiment 1

Figure 1:
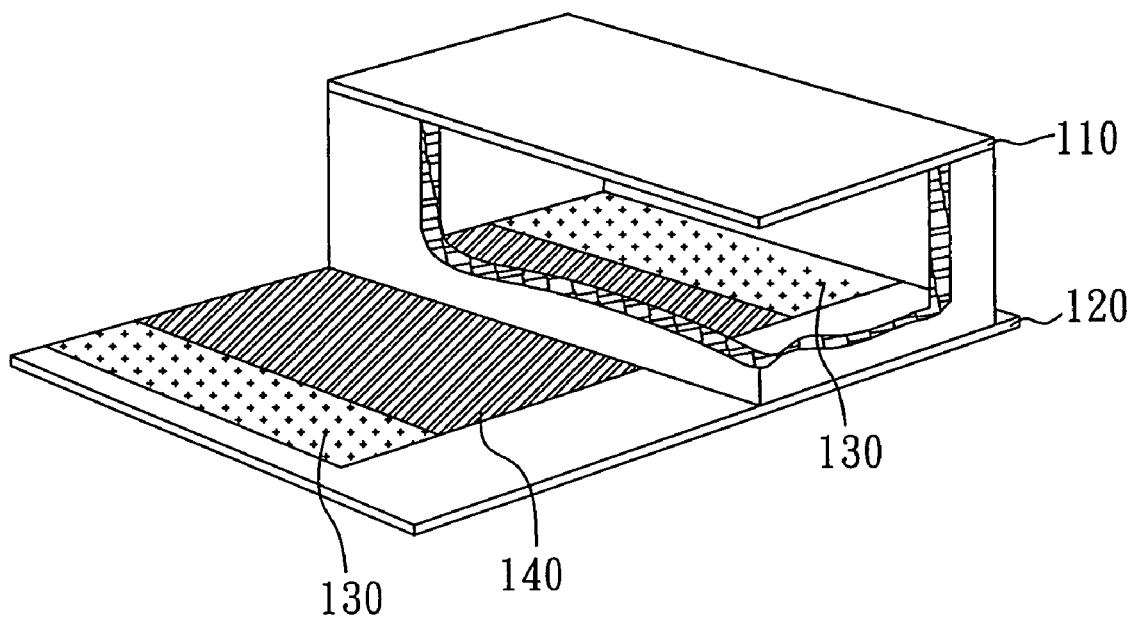
FIG. 1 is a perspective view showing the sealing of the cathode plate and the anode plate having a lump conducting band in the prior arts.
Figure 2A:
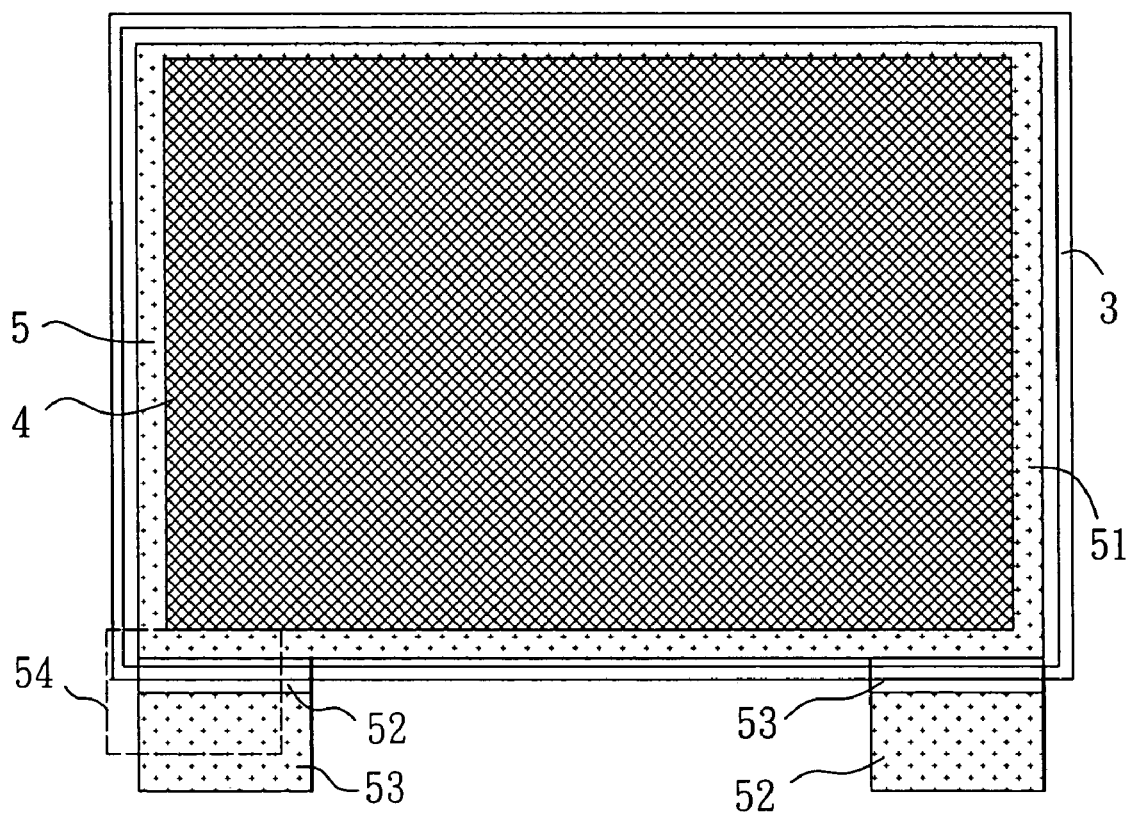
FIG. 2A is a top view of the field emission display device of the present invention.
Figure 2B:
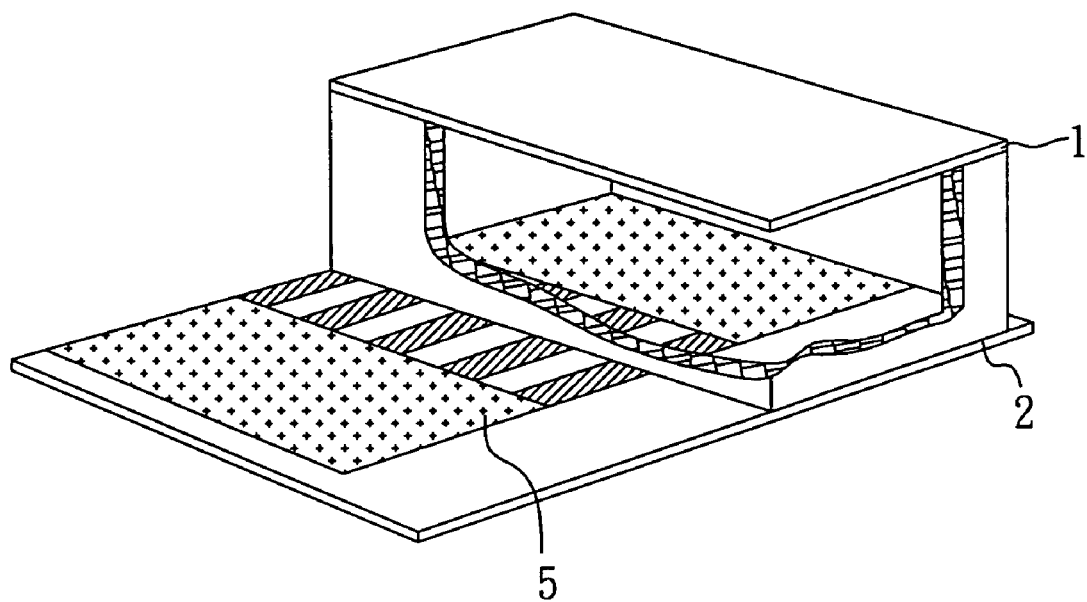
FIG. 2B is a perspective view showing the sealing of the cathode plate and the anode plate having an interspacing conductive band of one preferred embodiment of the present invention.
Figure 2C:
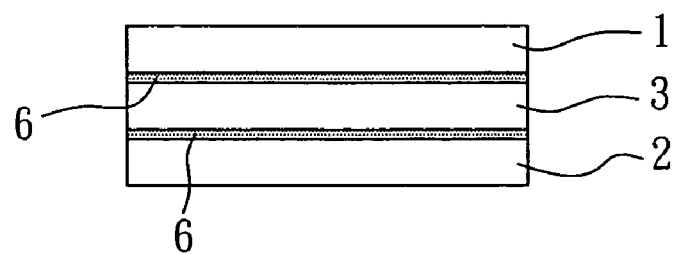
FIG. 2C is a cross-sectional view showing the sealing of the cathode plate and anode plate of the present invention.
Figure 3:
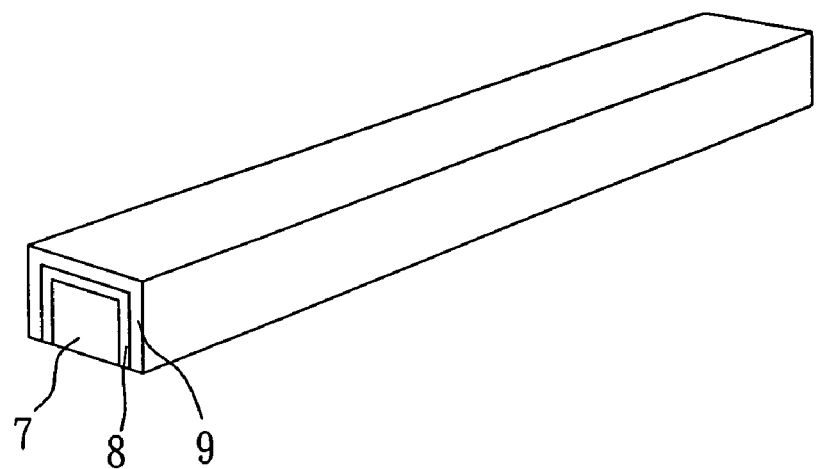
FIG. 3 is a perspective view showing the structure of the interspacing conductive band of the present invention.

With reference to FIGS. 2A, 2B, and 2C, there are shown the sealing of the cathode plate and the anode plate having an interspacing conductive band of one preferred embodiment of the present invention. FIG. 2B is the enlarged view of block 54 in FIG. 2A. In the present embodiment, on the cathode plate 1 of the field emission display device, there are formed a plurality of carbon nanotubes for generating the electrons and a plurality of transistors (not shown). Each of the transistors is corresponding to one of the carbon nanotubes respectively and controls the switches of the pixel. A fluorescent layer 4 and an electrically conductive layer 5 are formed on the anode plate 2. The electrically conductive layer 5 is a patterned ITO glass, which is formed through thin film deposition followed by a photolithography process. The electrically conductive layer 5 includes an anode conductive layer 51 and an interspacing conductive band 52, wherein the anode conductive layer 51 is sandwiched between the anode plate 2 and the fluorescent layer 4 for exerting a positive voltage on the anode plate 2. The positive voltage on the anode plate 2 functions to draw the electrons from the carbon nanotubes and subsequently accelerates the electrons to hit the fluorescent layer 4 for creating the luminescence phenomenon. The sealing of the cathode plate 1 and the anode plate 2 will be illustrated as follows. As shown in FIG. 2C, the adhesive layer, i.e. the frits 6 are spread on parts of the cathode plate 1 and the anode plate 2 that contact the side frame 3. The frits 6 are melted at a temperature around 440 degrees C., and then cooled for sealing. As a result, the side frame 3 is fixed between the cathode plate 1 and the anode plate 2 and a fixed space between the cathode plate and the anode plate is formed. The interspacing conductive band 52 with a pattern of straight stripes is sandwiched between the anode plate 2 and the side frame 3 to serve as external runners of the anode conductive layer 51 for connecting to the external cable lines. As shown in FIG. 3, each stripe of the interspacing conductive band, i.e. the ITO glass 7 is further covered with a chromium oxide layer 8 and a chromium layer 9 for protecting the ITO glass 7, extending the lifetime of the interspacing conductive band 52, and improving the characteristics of the interspacing conductive band 52. The conducting band 53 outside the spreading area of the frits 6 remains a lump. Because the interspacing conductive band eliminates the thermal stress produced during cooling, a high degree of vacuum in the hermetical space surrounded by the cathode plate 1 and the anode plate 2 is therefore obtained.

In the present embodiment, the formation of the chromium oxide layer 8 and the chromium layer 9 of the interspacing conductive band accords with that of the other conducting line in the active area for simplicity. The length of the interspacing conductive band is 9 mm, which is longer than the width of the spreading area of the frits, e.g. 7 mm, to prevent the ITO glass 7 from directly contacting with the frits 6. For detailed description, the thickness of the ITO glass 7 is 1 kÅ, and the width of the ITO glass 7 is 250 μm. Both the thicknesses of the chromium oxide layer 8 and the chromium layer 9 are 1.25 kÅ, and both of their widths are 350 μm. The interspacing conductive band has thirty-five stripes of parallel ITO glass 7. The width of the gap between the neighbor ITO glasses is also 350 μm, so the total width of the interspacing conductive band is 24.15 mm. If the coefficient of resistance of the ITO glass 7 is $2\times10^{-4}\Omega\cdot cm$, then the resistance of one ITO glass 7 is 72Ω, and the total resistance of the thirty-five parallel ITO glasses is calculated to be 2Ω. Therefore, the conducting band with the newly designed pattern of the present invention still functions as usual and does not conflict with the original design of the circuits in the active area. Furthermore, the flexibility in subsequent connection between the anode plate and the driving circuits, such as the circuit board is not influenced at all, neither is the sealing efficiency between the cathode and anode plates.

Embodiment 2

Figure 4:
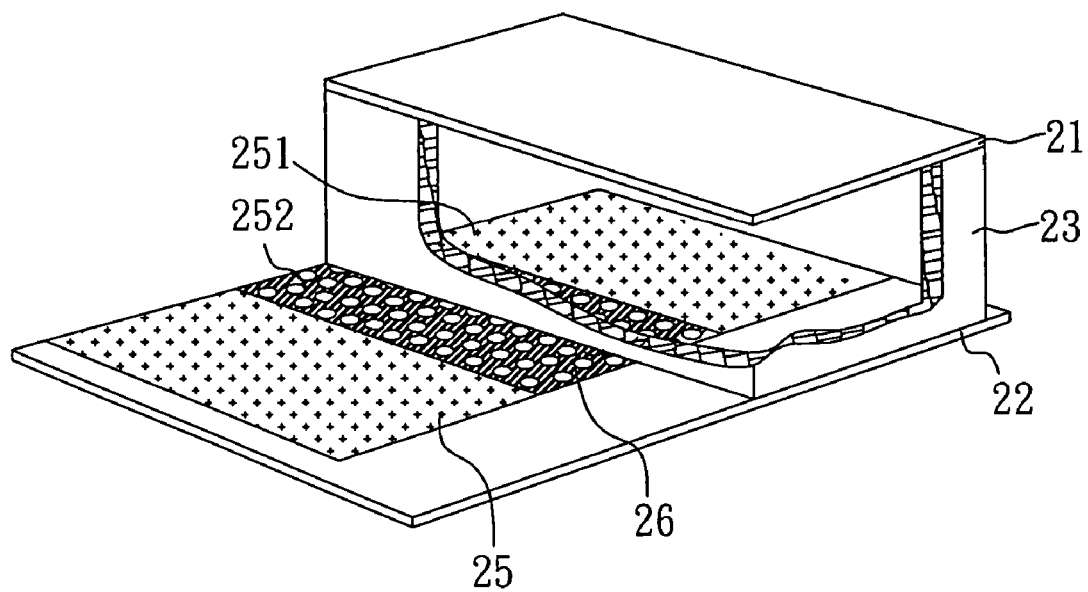
FIG. 4 is a perspective view showing the sealing of the cathode plate and the anode plate having an interspacing conductive band of another preferred embodiment of the present invention.

With reference to FIG. 4, there is shown the sealing of the cathode plate and the anode plate having an interspacing conductive band of another preferred embodiment of the present invention. The field emission display device of the present embodiment includes the cathode plate 21, the anode plate 22, the side frame 23 mounted between the cathode plate 21 and the anode plate 22 for forming a fixed space between the cathode plate 21 and the anode plate 22, a fluorescent layer formed at the inner side of the side frame 23 on the anode plate 22, an adhesive layer, e.g. a frit layer sandwiched between the cathode plate 21 and the side frame 23 as well as the anode plate 22 and the side frame 23 for bonding and sealing, a plurality of carbon nanotubes located on the cathode plate 21 for generating the electrons, and a plurality of transistors also located on the cathode plate 21 for controlling the switches of the pixel of the field emission display device. The electrically conductive layer 25 is a patterned ITO glass formed through thin film deposition followed by a photolithography process on the anode plate 22. The electrically conductive layer 25 includes an anode conductive layer 251 and an interspacing conductive band 252 with a porous pattern. The anode conductive layer 251 is sandwiched between the anode plate 22 and the fluorescent layer for exerting a positive voltage on the anode plate 22, which draws the electrons from the carbon nanotubes and subsequently accelerates the electrons to hit the fluorescent layer to produce the luminescence phenomenon. The interspacing conductive band 252 with a porous pattern is sandwiched between the anode plate 22 and the side frame 23 to serve as an external runner of the anode conductive layer 251. A chromium oxide layer and a chromium layer are formed on the interspacing conductive band 252 for protecting the interspacing conductive band 252, extending the lifetime of the interspacing conductive band 252, and improving the characteristics of the interspacing conductive band 252. The defining of the chromium oxide layer and the chromium layer is carried out simultaneously with that of the interspacing conductive band. The conducting band outside the spreading area of the frits 6 remains a lump.

In the present embodiment, the formation of the chromium oxide layer and the chromium layer on the interspacing conductive band accords with that of other conducting line in the active area for simplicity. The length of the interspacing conductive band is 9 mm, which is longer than the width of the spreading area of the frits, e.g. 5 mm, to prevent the interspacing conductive band, i.e. the ITO glass from directly contacting with the frits. For detailed description, the thickness of the interspacing conductive band is 1 kÅ, and the diameters of the holes dispersed in the interspacing conductive band with a porous pattern are all 350 μm. Both the thicknesses of the chromium oxide layer and the chromium layer are 1.25 kÅ. The square measure of the interspacing conductive band is designed to be equal to total square measure of the holes. Therefore, the conducting band with the newly designed pattern of the present invention still functions as usual and does not conflict with the original design of the circuits in the active area. Furthermore, the flexibility in subsequent connection between the anode plate and the driving circuits, such as the circuit board is not affected at all, neither is the sealing efficiency between the cathode and anode plates.

Although the present invention has been explained in relation to its preferred embodiment, it is to be understood that many other possible modifications and variations can be made without departing from the spirit and scope of the invention as hereinafter claimed.

What is claimed is:

1. An anode plate for a field emission display device comprising:
    a substrate;
    an anode conductive layer formed on the substrate;
    at least one interspacing conductive band having a plurality of internal gaps for connecting the anode conductive layer and external cable lines, wherein the interspacing conductive band covers a part of the anode conductive layer; and
    a fluorescent layer located on the anode conductive layer, to serve as a source of luminescence for a field emission display device;
    wherein the internal gaps of the interspacing conductive band form a pattern of straight stripes, bent stripes or porous style, the width of the interspacing conductive band equals that of the internal gap as the internal gap of the interspacing conductive band form a pattern of straight stripes or bent stripes and the square measure of the interspacing conductive band equals that of the internal gaps as the internal gaps of the interspacing conductive band form a pattern of porous style.

2. The anode plate as claimed in claim 1, wherein the anode conductive layer and the interspacing conductive band are made of indium tin oxide (ITO).

3. The anode plate as claimed in claim 1, wherein the anode conductive layer and the interspacing conductive band are formed through thin film deposition followed by a photolithography process or through screen-printing.

4. The anode plate as claimed in claim 1, wherein on the interspacing conductive bands, there are further comprising a metal layer, a metal oxide layer, or the combination thereof for covering and protecting the interspacing conductive band completely.

5. The anode plate as claimed in claim 1, wherein the metal layer is made of chromium (Cr), aluminum (Al), or zinc (Zn), and the metal oxide layer is made of chromium oxide, aluminum oxide, or zinc oxide.

6. A field emission display device comprising:
    a cathode plate having a plurality of carbon nanotubes formed thereon for generating electrons;
    an anode plate having an electrically conductive layer and a fluorescent layer formed thereon, wherein the electrically conductive layer is composed of an anode conductive layer and at least one interspacing conductive band, the anode conductive layer is sandwiched between the anode plate and the fluorescent layer for exerting positive voltage on the anode plate, which accelerates the electrons generated from the carbon nanotubes to hit the fluorescent layer and induces the luminescence phenomenon, and the interspacing conductive band serves to connect the anode conductive layer with external cable lines;

a side frame mounted on the joints where the cathode plate and the anode plate are bonded together, to form a fixed space between the cathode plate and the anode plate, wherein the fluorescent layer is located at the inner side of the side frame, and the interspacing conductive band is sandwiched between the anode plate and the side frame; and an adhesive layer disposed between the anode plate and the side frame, and between the cathode plate and the side frame, to fix the side frame on the anode plate as well as the cathode plate;

wherein the interspacing conductive band of the electrically conductive layer has a pattern of straight stripes, bent stripes, or porous style, the width of the interspacing conductive band equals that of the internal gap as the internal gaps of the interspacing conductive band form a pattern of straight stripes or bent stripes and the square measure of the interspacing conductive band equals that of the internal gaps as the internal gaps of the interspacing conductive band form a pattern of porous style.

7. The field emission display device as claimed in claim 6, wherein the electrically conductive layer is made of indium tin oxide (ITO).

8. The field emission display device as claimed in claim 6, wherein the electrically conductive layer is formed through thin film deposition followed by a photolithography process or through screen-printing.

9. The field emission display device as claimed in claim 6, where the adhesive layer is made of frits.

10. The field emission display device as claimed in claim 6, wherein on the interspacing conductive bands of the electrically conductive layer, there are further comprising a metal layer, a metal oxide layer, or the combination thereof for covering and protecting the interspacing conductive bands completely.

11. The field emission display device as claimed in claim 10, wherein the metal layer is made of chromium (Cr), aluminum (Al), or zinc (Zn), and the metal oxide layer is made of chromium oxide, aluminum oxide, or zinc oxide.

12. The field emission display device as claimed in claim 10, wherein the length of the interspacing conductive band is longer than the width of the adhesive layer for preventing the interspacing conductive band from touching with the adhesive layer.

13. The field emission display device as claimed in claim 6, wherein the cathode further comprises a plurality of transistors for controlling the carbon nanotubes.

* * * * *